No. 624,547. Patented May 9, 1899.
F. S. RUDGE.
SHOVEL.
(Application filed Oct. 26, 1898.)
(No Model.)
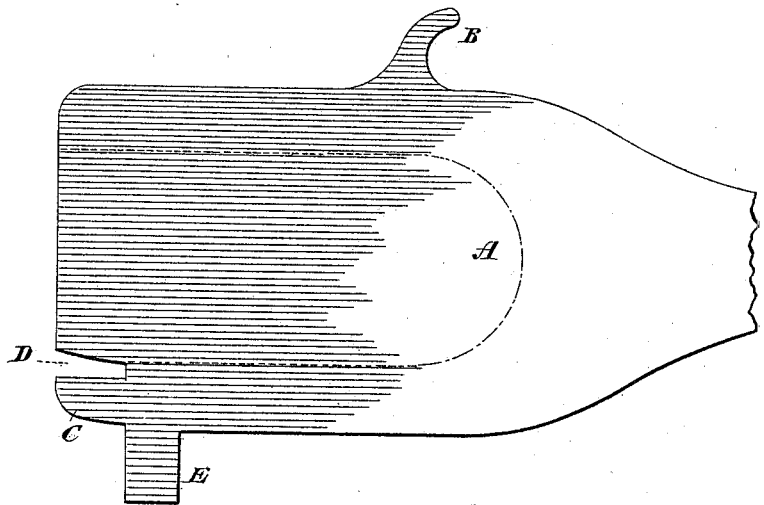
Fig. 1.
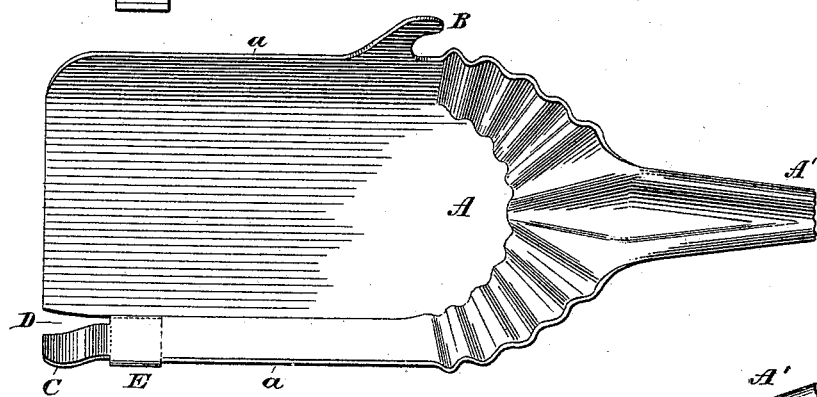
Fig. 2.
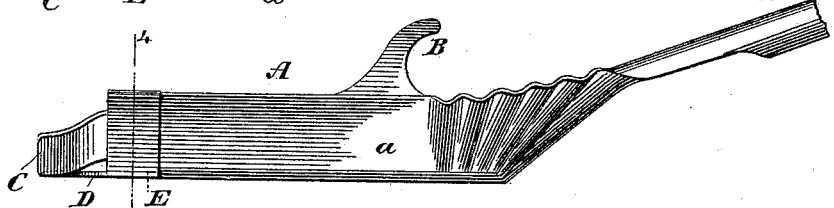
Fig. 3.
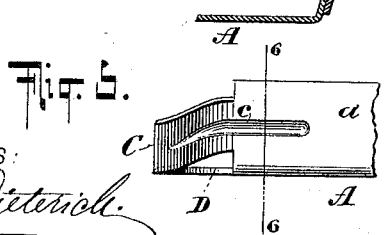
Fig. 4.
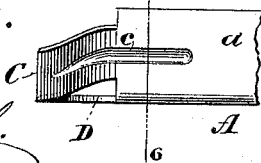
Fig. 5.
Fig. 6.
WITNESSES:
Gustave Dieterich.
John Kehlenbeck.
INVENTOR
Frederick S. Rudge
BY
Chas. S. Williams
ATTORNEY.
THE NORRIS PETERS CO., PHOTO-LITHO., WASHINGTON, D. C.

UNITED STATES PATENT OFFICE.

FREDERICK S. RUDGE, OF NEW YORK, N. Y.

SHOVEL.

SPECIFICATION forming part of Letters Patent No. 624,547, dated May 9, 1899.

Application filed October 26, 1898. Serial No. 694,630. (No model.)

*To all whom it may concern:*

Be it known that I, FREDERICK S. RUDGE, a citizen of the United States, residing at New York city, borough of Brooklyn, in the county of Kings and State of New York, have invented a new and useful Shovel, of which the following is a specification.

My invention relates to a shovel comprising a handle and a scoop secured thereto having a rim extending along its sides and back, the rim having one of its ends adjacent to the front edge of the scoop freed therefrom.

The object of my invention is to provide a shovel which may also be used to lift the lids of a stove, as well as to perform the usual services of a shovel. I accomplish this object by means of the device illustrated in the accompanying drawings, in which similar letters are used to designate similar parts throughout.

Figure 1 is a blank showing the shovel to be stamped from a sheet of metal. Fig. 2 is a plan view of my shovel. Fig. 3 is a side view of my shovel. Fig. 4 is a sectional view of my shovel on the line 4 4 of Fig. 3. Fig. 5 is a modification of the tongue of my shovel. Fig. 6 is a sectional view of the modification of the tongue on the line 6 6 of Fig. 5.

My shovel is preferably stamped from a sheet of metal, but may be cast, and is comprised of the scoop A, having the rim $a$ $a$, extending along its sides and back, the handle A', and the tongue C, Figs. 1, 2, and 3.

The tongue C is formed at the outermost end of the rim of the shovel by an incision D, substantially rectangular in shape, cut partly in the rim $a$ and partly in the scoop A, the inner edge of this incision D curving slightly toward the central line of the scoop A, the object of this curve being to prevent the contact of the scoop with the lid of a stove and facilitate the insertion of the tongue C beneath the catches of a stove-lid.

The tongue C is substantially rectangular in shape and is made by a rectangular cutting in the edge of the rim $a$ of such size as to fit beneath the catches of a stove-lid. Its outer end is slightly rounded to conform with the contour of the rim $a$ of the scoop A.

The tongue C curves outward from and again inward toward the line of the rim $a$ to further facilitate the insertion of the tongue beneath the catches of a stove-lid.

To strengthen the tongue C, a rectangular support or reinforcement E may be turned over outward from the rim $a$, so as to lap behind the tongue C, or a longitudinal corrugation or rib may be used to strengthen the tongue C, extending along a portion of the outer side of the rim $a$ and the tongue C, Figs. 5 and 6.

A C-shaped hook B may be placed on the rim $a$ on a side of the scoop opposite to the tongue C, the hook B being intended to be used for the purpose of pulling out the dampers or to operate the raking device of a stove.

Having fully described my invention, what I claim, and desire to protect by Letters Patent, is—

A shovel comprising a handle, a scoop secured thereto having a rim extending along its sides and back, said rim having one of its ends adjacent to the front edge of the scoop freed from the base of the scoop and a reinforcing-rib arranged partly in said rim and partly in the end thereof freed from the base of the scoop, substantially as herein described and set forth.

FREDERICK S. RUDGE.

Witnesses:
GEO. M. BOWER,
JACOB J. BOWMAN.